(12) United States Patent  
Sasaoka

(10) Patent No.: US 9,158,058 B2  
(45) Date of Patent: Oct. 13, 2015

(54) DISPLAY DEVICE AND TELEVISION SET

(71) Applicant: Funai Electric Co., Ltd., Daito-shi, Osaka (JP)

(72) Inventor: Hiromasa Sasaoka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 14/025,130

(22) Filed: Sep. 12, 2013

(65) Prior Publication Data

US 2014/0118627 A1 May 1, 2014

(30) Foreign Application Priority Data

Oct. 26, 2012 (JP) ................................. 2012-237296

(51) Int. Cl.
| | |
|---|---|
| *F21V 8/00* | (2006.01) |
| *H04N 5/66* | (2006.01) |
| *H04N 5/44* | (2011.01) |
| *A47F 3/00* | (2006.01) |
| *F21V 7/04* | (2006.01) |

(52) U.S. Cl.  
CPC .............. *G02B 6/0085* (2013.01); *G02B 6/009* (2013.01); *G02B 6/0088* (2013.01)

(58) Field of Classification Search  
CPC ...... H04N 5/66; H04N 5/64; G02F 1/133608; G02F 1/133604; G02F 1/133603; G02B 6/0085; G02B 6/009; G02B 6/0088  
See application file for complete search history.

(56) References Cited

U.S. PATENT DOCUMENTS

| | | | | |
|---|---|---|---|---|
| 7,978,286 | B2 * | 7/2011 | Kono et al. ..................... | 349/64 |
| 2005/0007556 | A1 * | 1/2005 | Yanagisawa .................... | 353/31 |
| 2007/0133222 | A1 * | 6/2007 | Watanabe et al. ............. | 362/561 |
| 2011/0211134 | A1 * | 9/2011 | Yoshikawa .................... | 348/739 |
| 2011/0309404 | A1 * | 12/2011 | Lee ................................. | 257/99 |
| 2012/0327307 | A1 * | 12/2012 | Nakamura et al. ............ | 348/725 |

FOREIGN PATENT DOCUMENTS

| | | |
|---|---|---|
| JP | 2007-163620 A | 6/2007 |
| JP | 2010-9787 A | 1/2010 |
| JP | 2010-9845 A | 1/2010 |
| JP | 2008-164688 A | 7/2013 |

* cited by examiner

*Primary Examiner* — Jefferey Harold  
*Assistant Examiner* — Sean Haiem  
(74) *Attorney, Agent, or Firm* — Crowell & Moring LLP

(57) ABSTRACT

This display device includes a display device body, a display portion arranged on the front side of the display device body, a light source substrate, a light guide plate arranged on the rear side of the display portion to be opposed to the light source substrate mounted with the light source, having a light incident surface including a side surface receiving light emitted from the light source, a heat sink arranged on the rear side of the light guide plate, including a light source substrate fixing portion to which the light source substrate is attached and fixed by a double-faced adhesive tape, and a substrate pressing portion pressing the front end surface of the light source substrate attached to the light source substrate fixing portion in a direction toward the bottom surface of the heat sink in a surface contact state.

20 Claims, 5 Drawing Sheets

DISPLAY DEVICE AND TELEVISION SET

BACKGROUND OF THE INVENTION

1. Field of the Invention

The present invention relates to a display device and a television set, and more particularly, it relates to a display device and a television set each including a light source substrate and a light guide plate.

2. Description of the Background Art

A display device including a light source substrate and a light guide plate is known in general, as disclosed in Japanese Patent Laying-Open No. 2007-163620.

Japanese Patent Laying-Open No. 2007-163620 discloses a liquid crystal display device (display device) including a liquid crystal display device body (display device body), a liquid crystal panel (display portion) arranged on the front side of the liquid crystal display device body, displaying an image, and a circuit board (light source substrate) mounted with an LED light source (light source) supplying light to the liquid crystal panel. This liquid crystal display device further includes a light guide plate opposed to the circuit board mounted with the LED light source on the rear side of the liquid crystal panel, having a light incident surface including a side surface receiving light emitted from the LED light source, guiding the light to the liquid crystal panel. This liquid crystal display device further includes a lower frame (heat sink) arranged on the rear side of the light guide plate, including a board fixing portion (light source substrate fixing portion) to which the circuit board is attached and fixed by a double-faced adhesive tape and an upper frame including a projecting portion coming into line contact with a side of the circuit board on the front side. The board fixing portion is formed by substantially vertically bending a part of the lower frame frontward.

In this liquid crystal display device, after completion of assembling, the circuit board (light source substrate) is held between the projecting portion of the upper frame and the lower frame in a state where the side of the circuit board on the front side comes into line contact with the projecting portion of the upper frame, whereby the circuit board is inhibited from falling down to the light guide plate when the double-faced adhesive tape is peeled off. Although the projecting portion of the upper frame comes into line contact with the side of the circuit board on the front side after the completion of assembling, it is not clear whether or not the projecting portion of the upper frame presses the side of the circuit board on the front side.

Conventionally, when the circuit board is attached to the board fixing portion of the lower frame, the circuit board is turned toward the board fixing portion, employing a pressed portion as a supporting point while the circuit board is inclined and the lower side (rear side) of a surface of the circuit board attached with the double-faced adhesive tape is pressed to a position of a surface of the vertically extending board fixing portion slightly distanced in the height direction from a bottom portion (of the lower frame). Therefore, the lower side of the circuit board attached to the board fixing portion may be slightly separated (displaced) in the height direction from the lower frame, and in this case, the LED light source is conceivably positionally displaced in the height direction from the light incident surface of the light guide plate.

In the liquid crystal display device according to Japanese Patent Laying-Open No. 2007-163620, however, the projecting portion of the upper frame simply comes into line contact with the side of the circuit board on the front side after completion of assembling, so that the separation (positional displacement) of the circuit board from the lower frame may be unable to be sufficiently modified. Therefore, the quantity of light incident on the light guide plate may be disadvantageously reduced by positional displacement between the LED light source and the light incident surface of the light guide plate.

SUMMARY OF THE INVENTION

The present invention has been proposed in order to solve the aforementioned problem, and an object of the present invention is to provide a display device and a television set each capable of suppressing a reduction in the quantity of light incident on a light guide plate by suppressing positional displacement between a light source and a light incident surface of the light guide plate.

A display device according to a first aspect of the present invention includes a display device body, a display portion arranged on the front side of the display device body, displaying an image, a light source substrate mounted with a light source supplying light to the display portion, a light guide plate arranged on the rear side of the display portion to be opposed to the light source substrate mounted with the light source, having a light incident surface including a side surface receiving light emitted from the light source, guiding the light to the display portion, a heat sink arranged on the rear side of the light guide plate, including a light source substrate fixing portion to which the light source substrate is attached and fixed by a double-faced adhesive tape, and a substrate pressing portion pressing the front end surface of the light source substrate attached to the light source substrate fixing portion in a direction toward the bottom surface of the heat sink in a surface contact state.

As hereinabove described, the display device according to the first aspect of the present invention is provided with the substrate pressing portion pressing the front end surface of the light source substrate attached to the light source substrate fixing portion in the direction toward the bottom surface of the heat sink in the surface contact state, whereby the front end surface of the light source substrate attached to the light source substrate fixing portion can be brought into surface contact with the substrate pressing portion to be pressed with force only in the direction toward the bottom surface of the heat sink by the substrate pressing portion, and hence sufficient pressing force to move the light source substrate toward the bottom surface of the heat sink can be obtained also when the light source substrate is attached to the light source substrate fixing portion, and the front end surface of the light source substrate can be stably pressed due to surface contact. Therefore, the separation (positional displacement) of the light source substrate from the bottom surface of the heat sink can be sufficiently modified even when the light source substrate is attached while separated (positionally displaced) toward the front side. Consequently, positional displacement between the light incident surface of the light guide plate and the light source can be suppressed, and hence a reduction in the quantity of light incident on the light guide plate can be suppressed. Furthermore, a reduction in the quantity of light incident on the light guide plate can be suppressed, and hence a reduction in luminance of light emitted from the light guide plate can be suppressed.

In the aforementioned display device according to the first aspect, the front end surface of the light source substrate is preferably flattened, and a portion of the substrate pressing portion pressing the front end surface of the light source substrate is preferably flattened. According to this structure, the front end surface of the light source substrate can be easily pressed while coming into surface contact with the portion of the substrate pressing portion pressing the front end surface of the light source substrate to be stabilized.

In the aforementioned display device according to the first aspect, a plurality of substrate pressing portions are preferably provided at prescribed intervals along the extensional direction of the light source substrate in a position corresponding to the front end surface of the light source substrate. According to this structure, the entire front end surface of the light source substrate can be easily pressed by the plurality of substrate pressing portions.

In the aforementioned display device according to the first aspect, the heat sink is preferably made of metal, the light source substrate fixing portion is preferably formed by bending a part of the heat sink frontward, the light source substrate preferably includes a rear end surface opposite to the front end surface in addition to the front end surface pressed by the substrate pressing portion, and the front end surface of the light source substrate is preferably pressed in the direction toward the bottom surface of the heat sink so that the rear end surface of the light source substrate comes into contact with the heat sink. According to this structure, the light source substrate can be accurately positioned by being held between the substrate pressing portion and the heat sink, and hence positional displacement between the light incident surface of the light guide plate and the light source can be effectively suppressed.

In this case, the rear end surface of the light source substrate is preferably flattened, and a portion of the heat sink coming into contact with the rear end surface of the light source substrate is preferably flattened. According to this structure, the rear end surface of the light source substrate and the portion of the heat sink coming into contact with the rear end surface of the light source substrate can be brought into contact with each other in a stable state, and hence the front end surface of the light source substrate can be more stably pressed by the substrate pressing portion.

In the aforementioned display device according to the first aspect, a light irradiation portion of the light source is preferably opposed to the light incident surface of the light guide plate in a state where the front end surface of the light source substrate attached to the light source substrate fixing portion is pressed in the direction toward the bottom surface of the heat sink by the substrate pressing portion. According to this structure, light emitted from the light irradiation portion of the light source can be guided to the light incident surface of the light guide plate in a state where the separation (positional displacement) of the light source substrate from the bottom surface of the heat sink is modified, and hence a reduction in the quantity of light incident on the light guide plate can be further suppressed.

In the aforementioned structure having the heat sink made of metal, the heat sink preferably includes a concave portion in a position corresponding to the rear end surface of the light source substrate, and the rear end surface of the light source substrate is preferably fitted into the concave portion. According to this structure, the separation (positional displacement) of the light source substrate from the bottom surface of the heat sink can be modified while the movement (displacement) of the rear end surface of the light source substrate in a direction toward the light guide plate (a direction perpendicular to a direction separating the light source substrate from the bottom surface of the heat sink) is suppressed by bringing the rear end surface of the light source substrate into contact with the concave portion. Therefore, positional displacement between the light incident surface of the light guide plate and the light source can be more effectively suppressed.

In the aforementioned structure having the heat sink made of metal, the double-faced adhesive tape is preferably shear-deformed in the direction toward the bottom surface of the heat sink in a state where the front end surface of the light source substrate is pressed by the substrate pressing portion so that the rear end surface of the light source substrate is moved to come into contact with the heat sink. According to this structure, the separation (positional displacement) of the light source substrate from the heat sink can be modified while the adhesive effect of the light source substrate on the light source substrate fixing portion is maintained when the front end surface of the light source substrate is pressed in the direction toward the bottom surface of the heat sink by the substrate pressing portion.

In this case, the double-faced adhesive tape is preferably configured to maintain adhesion of the light source substrate to the heat sink when the double-faced adhesive tape is shear-deformed in the direction toward the bottom surface of the heat sink. According to this structure, the separation of the light source substrate from the heat sink can be modified while the adhesive effect of the light source substrate on the light source substrate fixing portion is reliably maintained.

In the aforementioned structure having the shear-deformed double-faced adhesive tape, the double-faced adhesive tape is preferably attached to a position of the light source substrate separated by a prescribed interval from the rear end surface of the light source substrate. According to this structure, utilizing the interval between the position of the attached double-faced adhesive tape and the rear end surface of the light source substrate, the light source substrate can be moved to modify the separation of the light source substrate from the heat sink when the double-faced adhesive tape is shear-deformed. Thus, sufficient pressing force to move the light source substrate toward the bottom surface of the heat sink can be easily obtained.

In the aforementioned structure having the shear-deformed double-faced adhesive tape, the double-faced adhesive tape preferably has a thickness sufficient for shear-deformation in the direction toward the bottom surface of the heat sink. According to this structure, the double-faced adhesive tape can be easily shear-deformed in the direction toward the bottom surface of the heat sink.

The aforementioned display device according to the first aspect preferably further includes a resin frame configured to fix the light guide plate, arranged on the front side of the light source substrate, and the substrate pressing portion is preferably integrally formed on the resin frame to extend along the extensional direction of the front end surface of the light source substrate. According to this structure, an increase in the number of components can be suppressed, unlike the case where the substrate pressing portion is provided separately from the resin frame. Furthermore, a contact area between the substrate pressing portion and the front end surface of the light source substrate can be increased by the substrate pressing portion extending along the extensional direction of the front end surface of the light source substrate, and hence the front end surface of the light source substrate can be pressed in a more stable state to modify the separation (positional displacement) of the light source substrate from the heat sink.

In this case, the aforementioned display device preferably further includes a rear frame provided on the rear side of the heat sink, the resin frame preferably includes a first engaging portion, the rear frame preferably includes a second engaging portion engaging with the first engaging portion, and the substrate pressing portion is preferably configured to press the front end surface of the light source substrate while the first engaging portion and the second engaging portion engage with each other so that the front end surface of the light source substrate is held between the resin frame and the rear frame. According to this structure, the front end surface of the light source substrate can be pressed by the substrate pressing portion simultaneously when the resin frame is mounted on the rear frame, and hence an assembly operation can be simplified.

In the aforementioned structure including the resin frame, the first engaging portion of the resin frame preferably includes a hole, the second engaging portion of the rear frame preferably includes a claw portion, and the hole and the claw portion preferably engage with each other so that the movement of the resin frame and the rear frame in a direction separating from each other is restricted. According to this structure, an interval between the resin frame and the rear frame engaging with each other can be maintained constant, and hence a state of holding the light source substrate between the resin frame and the rear frame can be easily maintained.

In the aforementioned structure including the resin frame, the display device preferably further includes a light guide plate pressing portion integrally provided on the resin frame, the light source substrate preferably includes the front end surface pressed by the substrate pressing portion and a rear end surface opposite to the front end surface, an elastic member is preferably arranged on the rear side of the light guide plate, the substrate pressing portion and the light guide plate pressing portion provided integrally with the resin frame are preferably configured to press the front end surface of the light source substrate and a front surface of the light guide plate, respectively, in the direction toward the bottom surface of the heat sink in a surface contact state, the rear end surface of the light source substrate preferably comes into contact with the heat sink in a state where the front end surface of the light source substrate is pressed in the direction toward the bottom surface of the heat sink, and the light guide plate is preferably configured to be supported from the rear side toward the front side by the elastic member while the front side of the light guide plate is pressed in the direction toward the bottom surface of the heat sink. According to this structure, the movement of the front end surface of the light source substrate and the front surface of the light guide plate in a direction opposite to the direction toward the bottom surface of the heat sink can be restricted by the substrate pressing portion and the light guide plate pressing portion, respectively, and the light guide plate can be supported toward the front side by the elastic member and be positioned while the light source substrate is held between the substrate pressing portion and the heat sink and is positioned. Thus, positional displacement between the light incident surface of the light guide plate and the light source can be more accurately suppressed.

In the aforementioned structure further including the light guide plate pressing portion integrally provided on the resin frame, a reflective sheet is preferably arranged between the light guide plate and the elastic member, and the light guide plate is preferably configured to be supported through the reflective sheet from the rear side toward the front side by the elastic member while the front side of the light guide plate is pressed in the direction toward the bottom surface of the heat sink. According to this structure, light leakage from the light guide plate to the rear side can be suppressed, the movement of the front end surface of the light source substrate and the front surface of the light guide plate in the direction opposite to the direction toward the bottom surface of the heat sink can be restricted by the substrate pressing portion and the light guide plate pressing portion, respectively, and the light guide plate can be supported toward the front side by the elastic member and be positioned while the light source substrate is held between the substrate pressing portion and the heat sink and is positioned.

In the aforementioned display device according to the first aspect, the display device body preferably has a substantially rectangular shape as viewed from a front side, the light source substrate preferably includes a single light source substrate provided along one side of the edge of the display device body having the substantially rectangular shape, and the substrate pressing portion is preferably provided in a position corresponding to the front end surface of the single light source substrate on one side of the edge of the display device body. According to this structure, a reduction in the pressing force of the substrate pressing portion pressing the light source substrate can be suppressed, unlike the case where a plurality of light source substrates and a plurality of substrate pressing portions are provided along a plurality of sides of the edge of the display device body having the substantially rectangular shape, for example. Consequently, sufficient pressing force to move the light source substrate toward the bottom surface of the heat sink can be easily obtained.

In the aforementioned structure in which the heat sink includes the concave portion, a plurality of light sources are preferably provided in the extensional direction of the light source substrate, and the light irradiation portion of each of the plurality of light sources is preferably opposed to the light incident surface of the light guide plate in the state where the front end surface of the light source substrate attached to the light source substrate fixing portion is pressed in the direction toward the bottom surface of the heat sink by the substrate pressing portion. According to this structure, even when the light source substrate provided with the plurality of light sources is attached while separated (positionally displaced) toward the front side, the front end surface of the light source substrate attached to the light source substrate fixing portion can be brought into surface contact with the substrate pressing portion to be pressed with the force only in the direction toward the bottom surface of the heat sink by the substrate pressing portion, and hence positional displacement between the light incident surface of the light guide plate and the plurality of light sources can be suppressed. Therefore, a reduction in the quantity of light incident on the light guide plate from the plurality of light sources can be suppressed.

A television set according to a second aspect of the present invention includes a television display device body, a receiving portion receiving a broadcast signal, a display portion arranged on the front side of the television display device body, displaying an image, a light source substrate mounted with a light source supplying light to the display portion, a light guide plate arranged on the rear side of the display portion to be opposed to the light source substrate mounted with the light source, having a light incident surface including a side surface receiving light emitted from the light source, guiding the light to the display portion, a heat sink arranged on the rear side of the light guide plate, including a light source substrate fixing portion to which the light source substrate is attached and fixed by a double-faced adhesive tape, and a substrate pressing portion pressing the front end surface of the light source substrate attached to the light source substrate fixing portion in a direction toward the bottom surface of the heat sink in a surface contact state.

As hereinabove described, the television set according to the second aspect of the present invention is provided with the substrate pressing portion pressing the front end surface of the light source substrate attached to the light source substrate fixing portion in the direction toward the bottom surface of the heat sink in the surface contact state, whereby the front end surface of the light source substrate attached to the light source substrate fixing portion can be brought into surface contact with the substrate pressing portion to be pressed with force only in the direction toward the bottom surface of the heat sink by the substrate pressing portion, and hence sufficient pressing force to move the light source substrate toward the bottom surface of the heat sink can be obtained also when the light source substrate is attached to the light source substrate fixing portion, and the front end surface of the light source substrate can be stably pressed due to surface contact. Therefore, the separation (positional displacement) of the light source substrate from the bottom surface of the heat sink can be sufficiently modified even when the light source substrate is attached while separated (positionally displaced) toward the front side. Consequently, positional displacement between the light incident surface of the light guide plate and the light source can be suppressed, and hence a reduction in the quantity of light incident on the light guide plate can be suppressed. Furthermore, a reduction in the quantity of light incident on the light guide plate can be suppressed, and hence a reduction in luminance of light emitted from the light guide plate can be suppressed.

In the aforementioned television set according to the second aspect, the front end surface of the light source substrate is preferably flattened, and a portion of the substrate pressing portion pressing the front end surface of the light source substrate is preferably flattened. According to this structure, the front end surface of the light source substrate can be easily pressed with the force only in the direction toward the bottom surface of the heat sink while coming into surface contact with the portion of the substrate pressing portion pressing the front end surface of the light source substrate.

According to the present invention, as hereinabove described, positional displacement between the light source and the light incident surface of the light guide plate can be suppressed, and hence a reduction in the quantity of light incident on the light guide plate can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

The structure of a TV (television set) 100 according to the embodiment of the present invention is now described with reference to FIGS. 1 to 6. The TV 100 is an example of the "display device" in the present invention.

Figure 1:
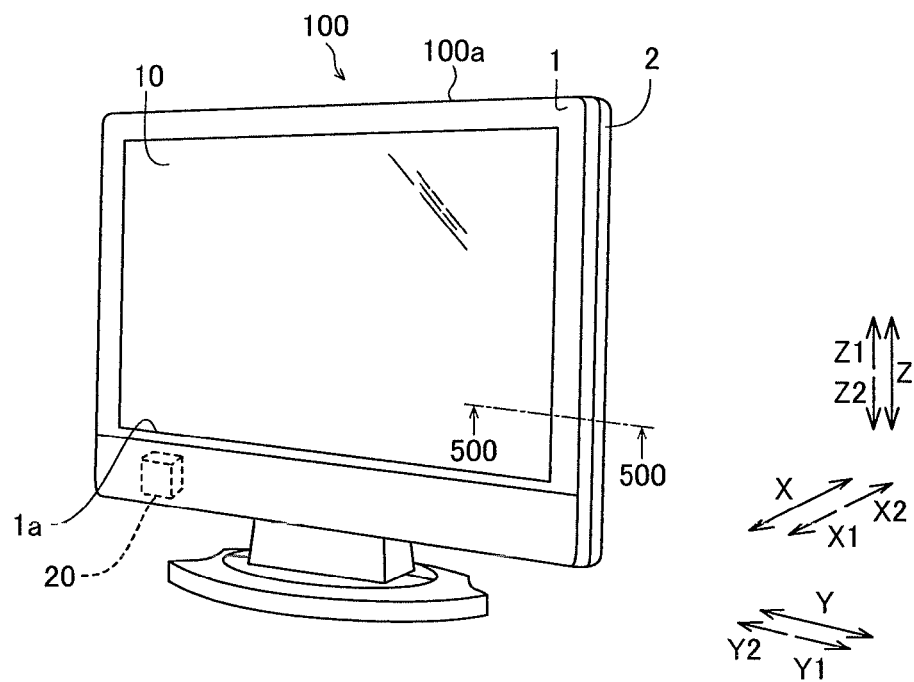
FIG. 1 is a perspective view showing the overall structure of a TV according to an embodiment of the present invention.

The TV 100 according to the embodiment of the present invention has a substantially rectangular shape as viewed from the front side (X1 side), as shown in FIG. 1. The TV 100 includes a front frame 1 having an opening 1a and a rear frame 2. The rear frame 2 includes claw portions 21 (see FIG. 3) engaging with holes 91 (see FIG. 3) of a resin frame 9 described later. A display portion 10 displaying an image is exposed from the opening 1a of a TV body 100a (front frame 1). The display portion 10 is mainly constituted by a liquid crystal cell. The TV 100 is configured to be capable of receiving a broadcast signal by a receiving portion 20. The TV body 100a is an example of the "display device body" in the present invention.

Figure 2:
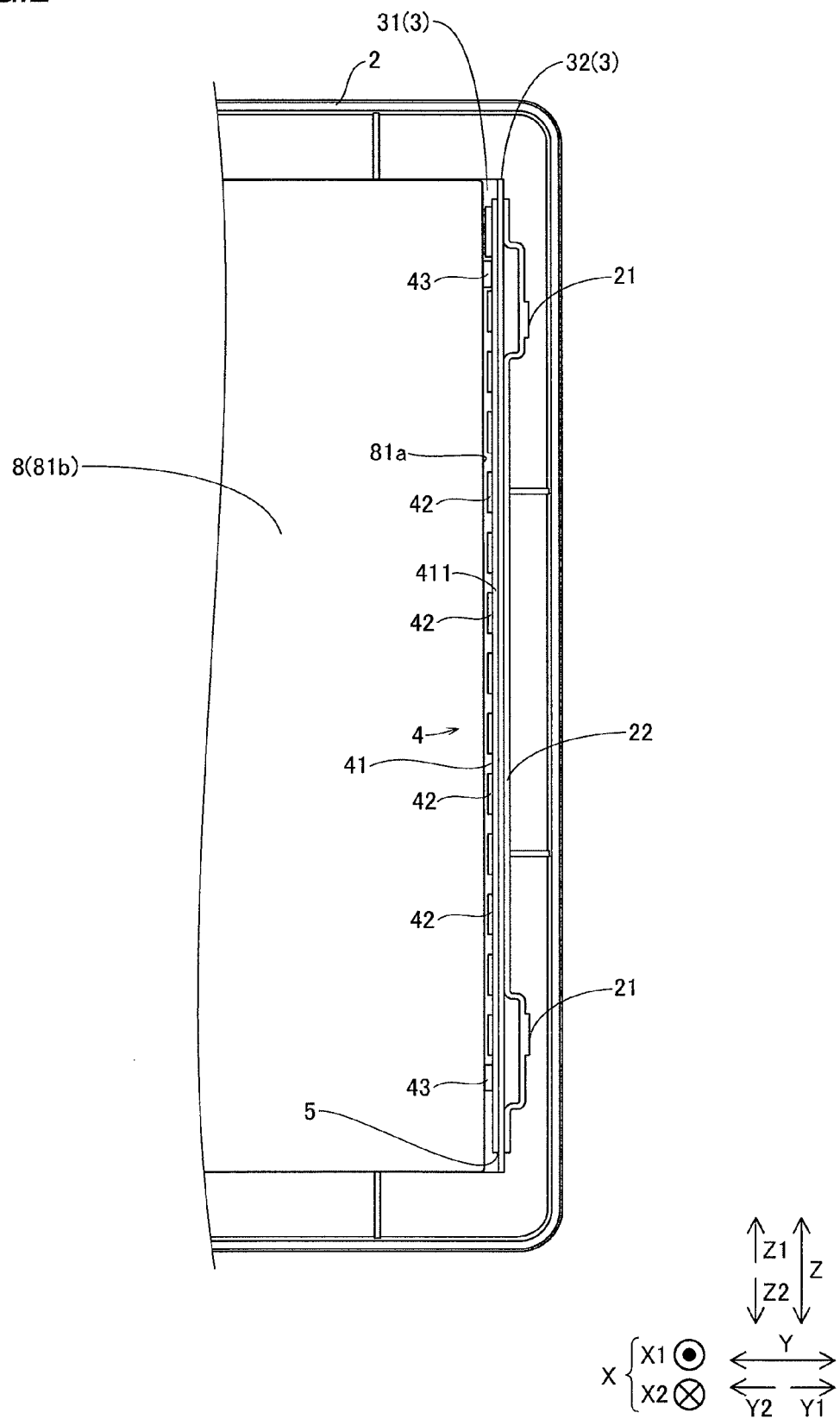
FIG. 2 is a diagram showing an LED substrate fixed to an LED substrate fixing portion of the TV according to the embodiment of the present invention.
Figure 3:
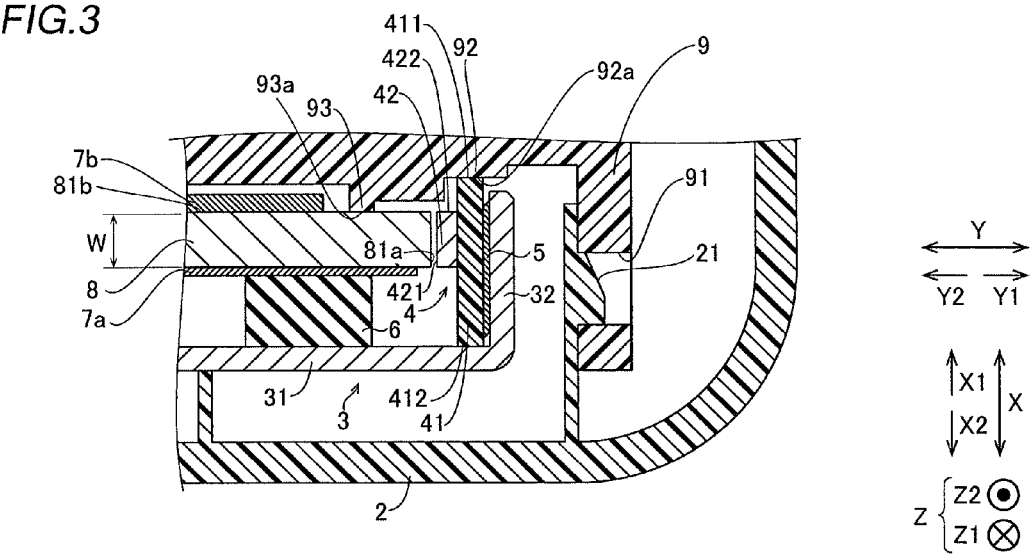
FIG. 3 is a sectional view taken along the line 500-500 in FIG. 1.
Figure 5:
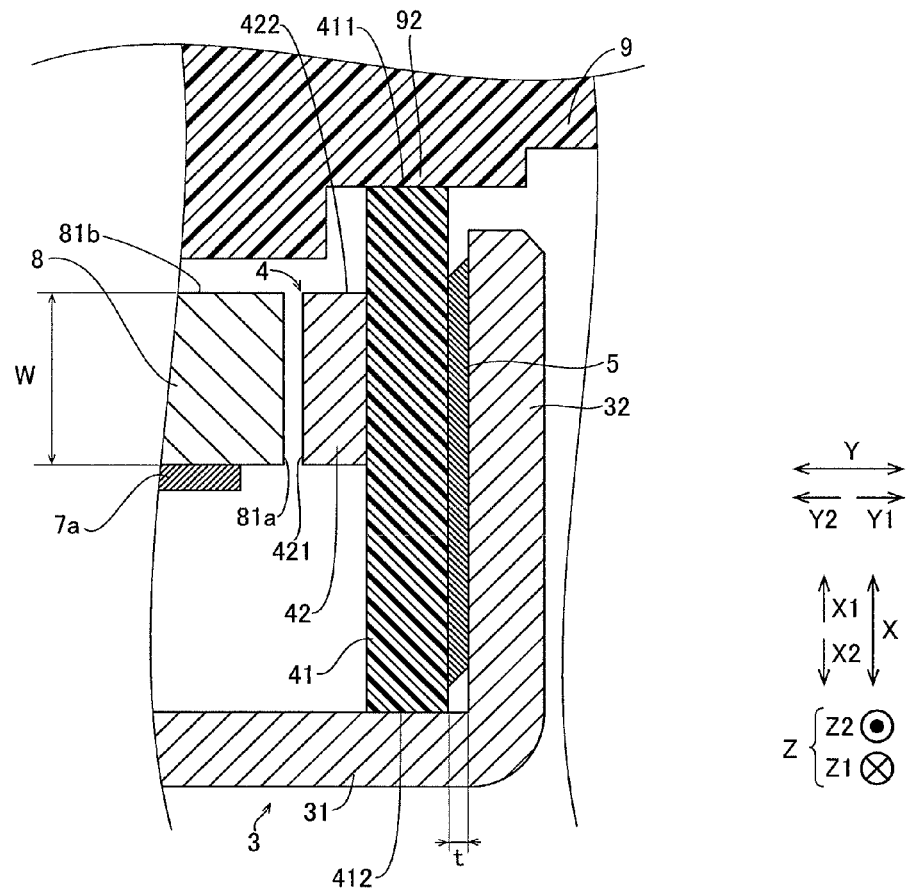
FIG. 5 is an enlarged view of the LED substrate fixing portion of the TV according to the embodiment of the present invention.

Inside the TV 100, a heat sink 3 and an LED module 4 including a plurality of LEDs 42 are provided, as shown in FIGS. 2 and 3. As shown in FIG. 3, a cushion 6, a reflective sheet 7a, a light guide plate 8, and an optical sheet 7b are stacked in this order from the rear side (X2 side) on the front side (X1 side) of the heat sink 3. The resin frame 9 is arranged on the front side of an LED substrate 41. The display portion 10 (see FIG. 1) is arranged on the front side of the resin frame 9. The LED module 4 is mounted on the heat sink 3 through a double-faced adhesive tape 5, as shown in FIGS. 2, 3, and 5. The LEDs 42 are examples of the "light source" in the present invention. The LED substrate 41 is an example of the "light source substrate" in the present invention.

According to this embodiment, the heat sink 3 has a function of releasing the heat of the LEDs 42. The heat sink 3 is made of metal (sheet metal). The heat sink 3 includes a heat sink body portion 31 and an LED substrate fixing portion 32, as shown in FIGS. 2, 3, and 5. Specifically, the heat sink 3 (heat sink body portion 31) is arranged on the rear side (X2 side) of the light guide plate 8, as shown in FIG. 3. The heat sink body portion 31 is flattened to extend in a direction Y. Specifically, a portion of the heat sink 3 (heat sink body portion 31) coming into contact with the rear end surface 412 of the LED substrate 41 is flattened. The LED substrate fixing portion 32 is configured to fix the LED substrate 41 by the double-faced adhesive tape 5. The LED substrate fixing portion 32 is formed by substantially vertically bending a portion of the heat sink 3 on a Y1 side frontward (along arrow X1). The rear frame 2 is arranged on the rear side of the heat sink 3. The heat sink 3 is configured such that the movement thereof along arrow Y1 is restricted by a restriction portion 22 formed on the Y1 side of the rear frame 2, as shown in FIG. 2. The LED substrate fixing portion 32 is an example of the "light source substrate fixing portion" in the present invention. The heat sink body portion 31 is an example of the "bottom surface" in the present invention.

The LED module 4 mainly includes the LED substrate 41 and the plurality of LEDs 42 mounted on the LED substrate 41, as shown in FIGS. 2, 3, 5, and 6. The LEDs 42 are configured to supply light to the display portion 10 (see FIG. 1). The LED module 4 is arranged on the right side (Y1 side)

when the TV body 100a (see FIG. 1) is viewed from the front side. The plurality of LEDs 42 are provided in the extensional direction (direction Z) of the LED substrate 41. In other words, the plurality of LEDs 42 are arranged in the vertical direction (direction Z) of the TV 100 on the LED substrate 41. As shown in FIG. 2, the LED substrate 41 is provided with spacers 43 for keeping an interval between the LEDs 42 and a light incident surface 81a of the light guide plate 8 constant. The spacers 43 are provided in the vicinity of both ends of the LED substrate 41 in the direction Z.

According to this embodiment, the LED substrate 41 has a substantially rectangular section, as shown in FIGS. 3 and 5. The LED substrate 41 includes a front end surface 411 pressed by a plurality of substrate pressing portions 92 described later and the rear end surface 412 opposite (X2 side) to the front end surface 411. The front end surface 411 and the rear end surface 412 of the LED substrate 41 are flattened. A surface of the LED substrate 41 on the Y1 side is attached to a surface of the LED substrate fixing portion 32 of the heat sink 3 on a Y2 side by the double-faced adhesive tape 5. The single LED substrate 41 is provided along one side of the edge of the substantially rectangular TV body 100a (the right side (Y1 side) as viewed from the front side (X1 side) of the TV body 100a), as shown in FIG. 2.

According to this embodiment, the double-faced adhesive tape 5 is configured to fix the LED module 4 to the heat sink 3, as shown in FIGS. 2, 3, and 5. The double-faced adhesive tape 5 is provided behind (Y1 side) the LED substrate 41 of the LED module 4. The double-faced adhesive tape 5 is attached to a position of the LED substrate 41 separated by a prescribed interval from the rear end surface 412 of the LED substrate 41. The double-faced adhesive tape 5 includes metal (aluminum, for example) having good thermal conductivity in order to improve heat release property. The double-faced adhesive tape 5 has a thickness t (0.5 mm, for example) sufficient for shear-deformation in a direction (direction X) toward the heat sink 3 (heat sink body portion 31), as shown in FIG. 5.

According to this embodiment, the cushion 6 is arranged on the rear side (X2 side) of the light guide plate 8, as shown in FIG. 3. The cushion 6 has a substantially rectangular section in the direction Z. The cushion 6 is configured to support the light guide plate 8 toward the front side (X1 side). The cushion 6 is made of a material (such as urethane foam) absorbing a shock. The cushion 6 is an example of the "elastic member" in the present invention.

As shown in FIG. 3, the reflective sheet 7a suppressing light leakage to the rear side (X2 side) of the light guide plate 8 is provided on the rear side of the light guide plate 8. The reflective sheet 7a is arranged between the light guide plate 8 and the cushion 6. The optical sheet 7b efficiently transmitting light emitted from the light guide plate 8 to the display portion 10 is provided on the front side (X1 side) of the light guide plate 8.

According to this embodiment, the light guide plate 8 has a function of guiding light to the display portion 10. As shown in FIG. 2, the light guide plate 8 has a substantially rectangular shape. The light guide plate 8 has the light incident surface 81a receiving light emitted from the LEDs 42 and a light emitting surface 81b emitting the light, as shown in FIGS. 2 and 3. Specifically, the light guide plate 8 is arranged on the rear side (X2 side) of the display portion 10 (see FIG. 1) to be opposed to the LED substrate 41 mounted with the LEDs 42 and has the light incident surface 81a including a side surface receiving the light emitted from the LEDs 42. The light incident surface 81a is opposed to the LEDs 42. The light emitting surface 81b is provided on the front side (X1 side) of the light guide plate 8, as shown in FIG. 3. The light emitting surface 81b is provided to extend in a direction (direction Y) substantially perpendicular to the light incident surface 81a. The light incident surface 81a has a width W substantially equal to that of each of light irradiation portions 421 of the LEDs 42 in the direction X. Furthermore, the light incident surface 81a substantially faces the light irradiation portions 421 of the LEDs 42 in the direction X.

Figure 4:
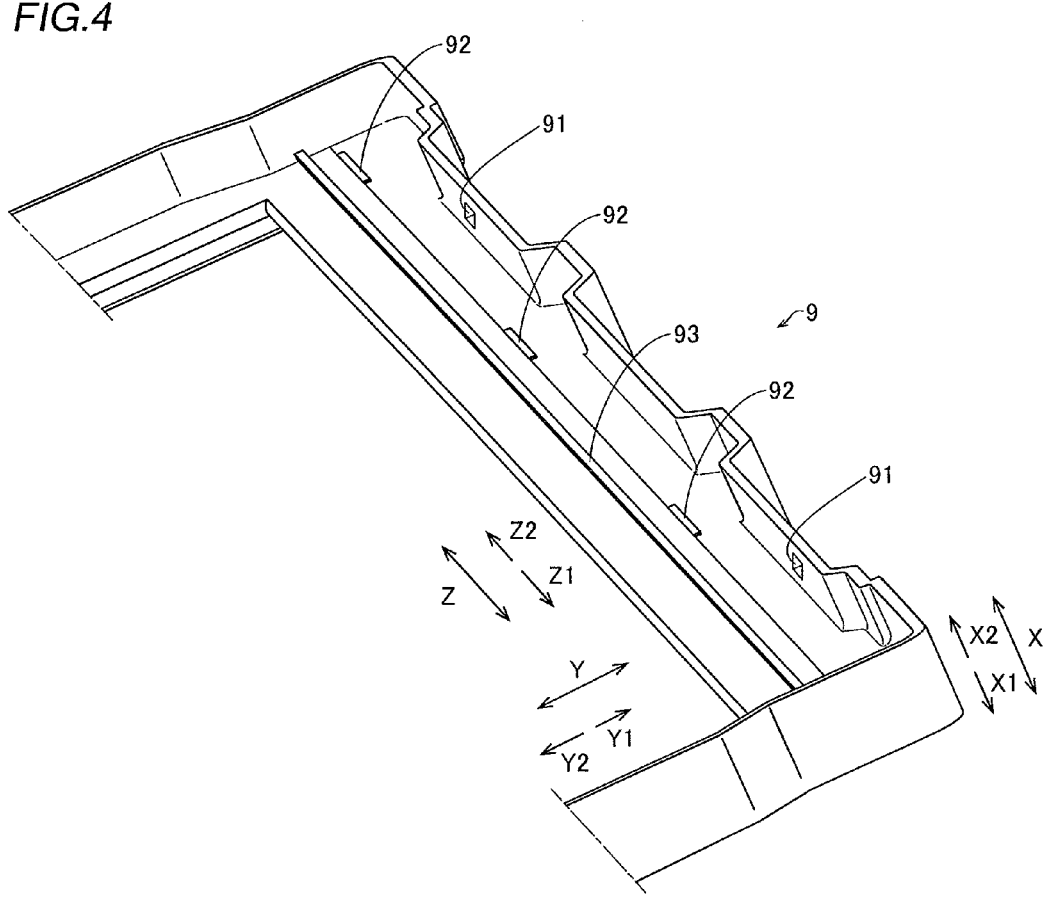
FIG. 4 is a diagram showing the rear side of a resin frame of the TV according to the embodiment of the present invention.

According to this embodiment, the resin frame 9 includes the holes 91, the substrate pressing portions 92, and a light guide plate pressing portion 93, as shown in FIG. 4. The resin frame 9 is configured to fix the light guide plate 8 to a prescribed position, as shown in FIG. 3. The holes 91 are configured to engage with the claw portions 21 of the rear frame 2. As shown in FIG. 4, the substrate pressing portions 92 and the light guide plate pressing portion 93 are formed integrally with the resin frame 9. Furthermore, the substrate pressing portions 92 and the light guide plate pressing portion 93 are formed on an inner surface on the X2 side. As shown in FIG. 3, the substrate pressing portions 92 and the light guide plate pressing portion 93 are configured to press the front end surface 411 of the LED substrate 41 and the front surface (a part of the light emitting surface 81b) of the light guide plate 8, respectively, in a direction (along arrow X2) toward the heat sink 3 (heat sink body portion 31) in a surface contact state. The holes 91 are examples of the "first engaging portion" in the present invention. The claw portions 21 are examples of the "second engaging portion" in the present invention.

The plurality of substrate pressing portions 92 are formed to extend along the extensional direction (direction Z) of the front end surface 411 (see FIG. 2) of the LED substrate 41, as shown in FIG. 4. Portions 92a (see FIG. 3) of the substrate pressing portions 92 pressing the front end surface 411 of the LED substrate 41 are flattened. Each of the substrate pressing portions 92 is in the form of a rib. The plurality of substrate pressing portions 92 are formed at prescribed intervals along the extensional direction (direction Z) of the LED substrate 41 in a position corresponding to the front end surface 411 of the LED substrate 41. The substrate pressing portions 92 are configured to press the front end surface 411 of the LED substrate 41 attached to the LED substrate fixing portion 32 in the direction (along arrow X2) toward the heat sink 3 (heat sink body portion 31) in the surface contact state, as shown in FIG. 3. The front end surface 411 of the LED substrate 41 is pressed in the direction toward the heat sink 3 (heat sink body portion 31), whereby the rear end surface 412 of the LED substrate 41 comes into surface contact with the heat sink 3. The holes 91 of the resin frame 9 and the claw portions 21 of the rear frame 2 engage with each other, whereby the front end surface 411 of the LED substrate 41 is pressed in the surface contact state by the substrate pressing portions 92 while held between the resin frame 9 and the rear frame 2. As shown in FIG. 2, the holes 91 and the claw portions 21 engage with each other, whereby the movement of the resin frame 9 and the rear frame 2 in a direction (direction X) separating from each other is restricted. The substrate pressing portions 92 are provided in a position corresponding to the front end surface 411 of the single LED substrate 41 on one side (a side in the direction Y) of the edge of the TV body 100a.

The light guide plate pressing portion 93 is formed to extend along the extensional direction (direction Z) of the front end surface 411 (see FIG. 2) of the LED substrate 41, as shown in FIG. 4. A portion 93a (see FIG. 3) of the light guide plate pressing portion 93 pressing the light guide plate 8 is flattened. The light guide plate pressing portion 93 is in the form of a rib. The light guide plate pressing portion 93 is configured to press the front surface (a part of the light emitting surface 81b) of the light guide plate 8 in the direction (along arrow X2) toward the heat sink 3 (heat sink body portion 31) in a surface contact state, as shown in FIG. 3. The light guide plate 8 is configured to be supported from the rear side (X2 side) toward the front side (X1 side) by the cushion 6 while the front side (X1 side) thereof is pressed in the direction toward the heat sink 3 (heat sink body portion 31). Furthermore, the light guide plate 8 is configured to be supported through the reflective sheet 7a from the rear side toward the front side by the cushion 6 while the front side (the side (X1 side) of the light emitting surface 81b) of the light guide plate 8 is pressed in the direction (along arrow X2) toward the heat sink body portion 31. The cushion 6 is provided in a position corresponding to the light guide plate pressing portion 93. The holes 91 of the resin frame 9 and the claw portions 21 of the rear frame 2 engage with each other, whereby the front surface of the light guide plate 8 is pressed by the light guide plate pressing portion 93 while held between the resin frame 9 and the rear frame 2.

As shown in FIGS. 3 and 5, the front end surfaces 422 of the LEDs 42 are aligned with the light emitting surface 81b of the light guide plate 8 in the direction X in a state where the substrate pressing portions 92 and the light guide plate pressing portion 93 press the front end surface 411 of the LED substrate 41 and the front surface (a part of the light emitting surface 81b) of the light guide plate 8, respectively, along arrow X2. The respective light irradiation portions 421 of the plurality of LEDs 42 are opposed to the light incident surface 81a of the light guide plate 8 in a state where the front end surface 411 of the LED substrate 41 attached to the LED substrate fixing portion 32 is pressed in the direction (along arrow X2) toward the heat sink body portion 31 by the substrate pressing portions 92. The front end surface 411 of the LED substrate 41 is pressed by the substrate pressing portions 92, whereby the double-faced adhesive tape 5 is shear-deformed in the direction (along arrow X2) toward the heat sink 3 (heat sink body portion 31) in a state where the rear end surface 412 is moved to come into contact with the heat sink 3. The double-faced adhesive tape 5 is configured to maintain adhesion between the LED substrate 41 and the heat sink 3 when the double-faced adhesive tape 5 is shear-deformed. The double-faced adhesive tape 5 is configured to maintain adhesion of the LED substrate 41 to the heat sink 3 when the double-faced adhesive tape 5 is shear-deformed in the direction toward the heat sink body portion 31.

Figure 6:
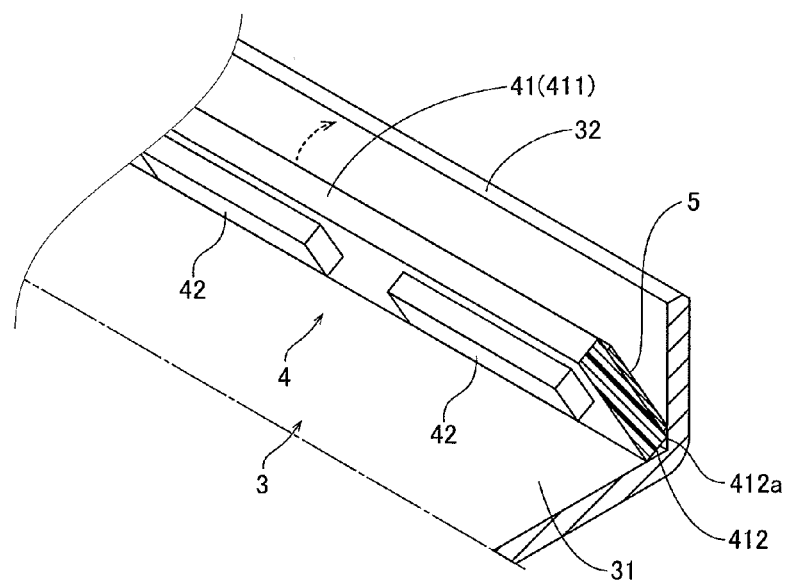
FIG. 6 is a diagram showing a state where the LED substrate of the TV according to the embodiment of the present invention is attached to the LED substrate fixing portion.

A procedure for mounting the LED substrate 41 is now described with reference to FIGS. 2, 3, 5, and 6. First, the LED substrate 41 is mounted on the LED substrate fixing portion 32 of the heat sink 3 through the double-faced adhesive tape 5. At this time, the LED substrate 41 is turned toward the LED substrate fixing portion 32, employing a corner 412a of the rear end surface 412 of the LED substrate 41 as a supporting point while the corner 412a comes into contact with the LED substrate fixing portion 32, as shown in FIG. 6. Then, the LED substrate 41 is attached to the heat sink 3 (LED substrate fixing portion 32) by the double-faced adhesive tape 5. Then, the rear frame 2 is arranged on the rear side of the heat sink 3 mounted with the LED substrate 41, as shown in FIG. 2. Then, the cushion 6 is arranged on the front side (X1 side) of the heat sink 3, as shown in FIG. 3. Then, the reflective sheet 7a, the light guide plate 8, and the optical sheet 7b are arranged on the heat sink 3 in this order from the rear side (X2 side). In this state, the resin frame 9 is mounted on the rear frame 2 from the front side, whereby the front end surface 411 of the LED substrate 41 and the front surface (a part of the light emitting surface 81b) of the light guide plate 8 are pressed in the direction (along arrow X2) toward the heat sink 3 (heat sink body portion 31) in the surface contact state by the substrate pressing portions 92 and the light guide plate pressing portion 93, respectively. Thus, the double-faced adhesive tape 5 is shear-deformed in the direction (along arrow X2) toward the heat sink 3 (heat sink body portion 31) in the state where the rear end surface 412 of the LED substrate 41 is moved to come into contact with the heat sink 3, as shown in FIG. 5.

According to this embodiment, as hereinabove described, the TV 100 is provided with the substrate pressing portions 92 pressing the front end surface 411 of the LED substrate 41 in the direction toward the heat sink body portion 31 in the surface contact state. Thus, the front end surface 411 of the LED substrate 41 attached to the LED substrate fixing portion 32 can be brought into surface contact with the substrate pressing portions 92 to be pressed with force only in the direction toward the heat sink body portion 31 by the substrate pressing portions 92, and hence sufficient pressing force to move the LED substrate 41 toward the heat sink body portion 31 can be obtained, and the front end surface 411 of the LED substrate 41 can be stably pressed due to surface contact. Therefore, the separation (positional displacement) of the LED substrate 41 from the heat sink body portion 31 can be sufficiently modified even when the LED substrate 41 is attached while separated (positionally displaced) toward the front side. Consequently, positional displacement between the light incident surface 81a of the light guide plate 8 and the LEDs 42 can be suppressed, and hence a reduction in the quantity of light incident on the light guide plate 8 can be suppressed. Furthermore, a reduction in the quantity of light incident on the light guide plate 8 can be suppressed, and hence a reduction in luminance of light emitted from the light guide plate 8 can be suppressed.

According to this embodiment, as hereinabove described, the front end surface 411 of the LED substrate 41 is flattened, and the portions 92a of the substrate pressing portions 92 pressing the front end surface 411 of the LED substrate 41 are flattened. Thus, the front end surface 411 of the LED substrate 41 can be easily pressed while coming into surface contact with the portions 92a of the substrate pressing portions 92 pressing the front end surface 411 to be stabilized.

According to this embodiment, as hereinabove described, the plurality of substrate pressing portions 92 are provided at the prescribed intervals along the extensional direction of the LED substrate 41 in the position corresponding to the front end surface 411 of the LED substrate 41. Thus, the entire front end surface 411 of the LED substrate 41 can be easily pressed by the plurality of substrate pressing portions 92.

According to this embodiment, as hereinabove described, the LED substrate fixing portion 32 is formed by bending a part of the heat sink 3 made of metal frontward, and the front end surface 411 of the LED substrate 41 is pressed in the direction toward the heat sink body portion 31 so that the rear end surface 412 of the LED substrate 41 comes into contact with the heat sink 3. Thus, the LED substrate 41 can be accurately positioned by being held between the substrate pressing portions 92 and the heat sink 3, and hence positional displacement between the light incident surface 81a of the light guide plate 8 and the LEDs 42 can be effectively suppressed.

According to this embodiment, as hereinabove described, the rear end surface 412 of the LED substrate 41 is flattened, and the portion of the heat sink 3 coming into contact with the rear end surface 412 of the LED substrate 41 is flattened. Thus, the rear end surface 412 of the LED substrate 41 and the portion of the heat sink 3 coming into contact with the rear end surface 412 of the LED substrate 41 can be brought into contact with each other in a stable state, and hence the front end surface 411 of the LED substrate 41 can be more stably pressed by the substrate pressing portions 92.

According to this embodiment, as hereinabove described, the light irradiation portions 421 of the LEDs 42 are opposed to the light incident surface 81a of the light guide plate 8 in the state where the front end surface 411 of the LED substrate 41 attached to the LED substrate fixing portion 32 is pressed in the direction toward the heat sink body portion 31 by the substrate pressing portions 92. Thus, light emitted from the light irradiation portions 421 of the LEDs 42 can be guided to the light incident surface 81a of the light guide plate 8 in a state where the separation (positional displacement) of the LED substrate 41 from the heat sink body portion 31 is modified, and hence a reduction in the quantity of light incident on the light guide plate 8 can be further suppressed.

According to this embodiment, as hereinabove described, the double-faced adhesive tape 5 is shear-deformed in the direction toward the heat sink body portion 31 in the state where the front end surface 411 of the LED substrate 41 is pressed by the substrate pressing portions 92 so that the rear end surface 412 of the LED substrate 41 is moved to come into contact with the heat sink 3. Thus, the separation (positional displacement) of the LED substrate 41 from the heat sink 3 can be modified while the adhesive effect of the LED substrate 41 on the LED substrate fixing portion 32 is maintained when the front end surface 411 of the LED substrate 41 is pressed by the substrate pressing portions 92.

According to this embodiment, as hereinabove described, the double-faced adhesive tape 5 is configured to maintain adhesion of the LED substrate 41 to the heat sink 3 when the double-faced adhesive tape 5 is shear-deformed in the direction toward the heat sink body portion 31. Thus, the separation of the LED substrate 41 from the heat sink 3 can be modified while the adhesive effect of the LED substrate 41 on the LED substrate fixing portion 32 is reliably maintained.

According to this embodiment, as hereinabove described, the double-faced adhesive tape 5 is attached to the position of the LED substrate 41 separated by the prescribed interval from the rear end surface 412 of the LED substrate 41. Thus, utilizing the interval between the position of the attached double-faced adhesive tape 5 and the rear end surface 412 of the LED substrate 41, the LED substrate 41 can be moved to modify the separation of the LED substrate 41 from the heat sink 3 when the double-faced adhesive tape 5 is shear-deformed. Thus, sufficient pressing force to move the LED substrate 41 toward the heat sink body portion 31 can be easily obtained.

According to this embodiment, as hereinabove described, the double-faced adhesive tape 5 has the thickness sufficient for shear deformation in the direction toward the heat sink body portion 31. Thus, the double-faced adhesive tape 5 can be easily shear-deformed in the direction toward the heat sink body portion 31.

According to this embodiment, as hereinabove described, the TV 100 is provided with the resin frame 9 configured to fix the light guide plate 8, arranged on the front side of the LED substrate 41, and the substrate pressing portions 92 are integrally formed on the resin frame 9 to extend along the extensional direction of the front end surface 411 of the LED substrate 41. Thus, an increase in the number of components can be suppressed. Furthermore, a contact area between the substrate pressing portions 92 and the front end surface 411 of the LED substrate 41 can be increased by the substrate pressing portions 92 extending along the extensional direction of the front end surface 411 of the LED substrate 41, and hence the front end surface 411 of the LED substrate 41 can be pressed in a more stable state.

According to this embodiment, as hereinabove described, the TV 100 is provided with the rear frame 2 on the rear side of the heat sink 3, the holes 91 are formed in the resin frame 9, and the claw portions 21 engaging with the holes 91 are formed on the rear frame 2. Furthermore, the substrate pressing portions 92 are configured to press the front end surface 411 of the LED substrate 41 while the holes 91 and the claw portions 21 engage with each other so that the front end surface 411 of the LED substrate 41 is held between the resin frame 9 and the rear frame 2. Thus, the front end surface 411 of the LED substrate 41 can be pressed by the substrate pressing portions 92 simultaneously when the resin frame 9 is mounted on the rear frame 2, and hence an assembly operation can be simplified.

According to this embodiment, as hereinabove described, the holes 91 and the claw portions 21 engage with each other so that the movement of the resin frame 9 and the rear frame 2 in the direction separating from each other is restricted. Thus, an interval between the resin frame 9 and the rear frame 2 engaging with each other can be maintained constant, and hence a state of holding the LED substrate 41 between the resin frame 9 and the rear frame 2 can be easily maintained.

According to this embodiment, as hereinabove described, the cushion 6 is arranged on the rear side of the light guide plate 8, the substrate pressing portions 92 and the light guide plate pressing portion 93 are formed to press the front end surface 411 of the LED substrate 41 and the front surface of the light guide plate 8, respectively, in the direction toward the heat sink body portion 31 in the surface contact state, the rear end surface 412 of the LED substrate 41 comes into contact with the heat sink 3 in the state where the front end surface 411 of the LED substrate 41 is pressed in the direction toward the heat sink body portion 31, and the light guide plate 8 is configured to be supported from the rear side by the cushion 6 while pressed in the direction toward the heat sink body portion 31. Thus, the movement of the front end surface 411 of the LED substrate 41 and the front surface of the light guide plate 8 in a direction opposite to the direction toward the heat sink 3 can be restricted by the substrate pressing portions 92 and the light guide plate pressing portion 93, respectively, and the light guide plate 8 can be supported toward the front side by the cushion 6 and be positioned while the LED substrate 41 is held between the substrate pressing portions 92 and the heat sink 3 and is positioned. Thus, positional displacement between the light incident surface 81a of the light guide plate 8 and the LEDs 42 can be more accurately suppressed.

According to this embodiment, as hereinabove described, the reflective sheet 7a is arranged between the light guide plate 8 and the cushion 6, and the light guide plate 8 is configured to be supported through the reflective sheet 7a from the rear side toward the front side by the cushion 6 while the front side of the light guide plate 8 is pressed in the direction toward the heat sink body portion 31. Thus, light leakage from the light guide plate 8 to the rear side can be suppressed, the movement of the front end surface 411 of the LED substrate 41 and the front surface of the light guide plate 8 in the direction opposite to the direction toward the heat sink body portion 31 can be restricted by the substrate pressing portions 92 and the light guide plate pressing portion 93, respectively, and the light guide plate 8 can be supported toward the front side by the cushion 6 and be positioned while the LED substrate 41 is held between the substrate pressing portions 92 and the heat sink 3 and is positioned.

According to this embodiment, as hereinabove described, the TV body 100a has the substantially rectangular shape as viewed from the front side, and the single LED substrate 41 is provided along one side of the edge of the substantially rectangular TV body 100a. Furthermore, the substrate pressing portions 92 are provided in the position corresponding to the front end surface 411 of the single LED substrate 41 on one side of the edge of the TV body 100a. Thus, a reduction in the pressing force of the substrate pressing portions 92 pressing the LED substrate 41 can be suppressed, unlike the case where a plurality of LED substrates 41 and a plurality of substrate pressing portions 92 are provided along a plurality of sides of the edge of the substantially rectangular TV body 100a, for example. Consequently, sufficient pressing force to move the LED substrate 41 toward the heat sink body portion 31 can be easily obtained.

According to this embodiment, as hereinabove described, the plurality of LEDs 42 are provided in the extensional direction of the LED substrate 41, and the respective light irradiation portions 421 of the plurality of LEDs 42 are opposed to the light incident surface 81a of the light guide plate 8 in the state where the front end surface 411 of the LED substrate 41 attached to the LED substrate fixing portion 32 is pressed in the direction toward the heat sink body portion 31 by the substrate pressing portions 92. Thus, even when the LED substrate 41 provided with the plurality of LEDs 42 is attached while separated (positionally displaced) toward the front side, the front end surface 411 of the LED substrate 41 attached to the LED substrate fixing portion 32 can be brought into surface contact with the substrate pressing portions 92 to be pressed with force only in the direction toward the heat sink body portion 31 by the substrate pressing portions 92, and hence positional displacement between the light incident surface 81a of the light guide plate 8 and the plurality of LEDs 42 can be suppressed. Therefore, a reduction in the quantity of light incident on the light guide plate 8 from the plurality of LEDs 42 can be suppressed.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the present invention is applied to the TV (television set) as the display device in the aforementioned embodiment, the present invention is not restricted to this. The present invention is also applicable to another display device such as a monitor of a PC (personal computer).

Figure 7:
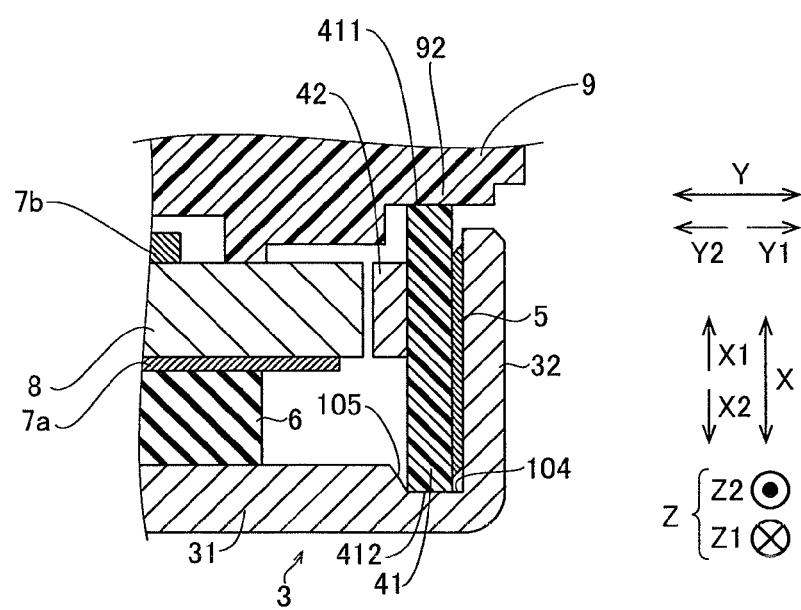
FIG. 7 is a diagram showing a heat sink of a TV according to a modification of the embodiment of the present invention.

While the front side of the heat sink is flattened in the aforementioned embodiment, the present invention is not restricted to this. According to the present invention, a concave portion 104 may alternatively be provided in a position of the front side of the heat sink corresponding to the rear end surface of the light source substrate, as shown in FIG. 7. Specifically, the rear end surface of the light source substrate is fitted into the concave portion 104 provided in the position of the heat sink corresponding to the rear end surface of the light source substrate. Thus, the separation (positional displacement) of the light source substrate from the heat sink can be modified while the movement (displacement) of the rear end surface of the light source substrate in a direction toward the light guide plate (a direction perpendicular to a direction separating the light source substrate from the heat sink) is suppressed by bringing the rear end surface of the light source substrate into contact with the concave portion 104. Therefore, positional displacement between the light incident surface of the light guide plate and the light source can be more effectively suppressed. In this case, an inclination portion 105 may alternatively be formed on the corner of the concave portion 104 closer to the light guide plate. Thus, the rear end surface of the light source substrate can be guided by the inclination portion 105 when the front end surface of the light source substrate attached to the light source substrate fixing portion is pressed in the direction toward the heat sink in a surface contact state, and hence the rear end surface of the light source substrate can be smoothly brought into contact with the heat sink (a bottom portion of the concave portion 104).

While the plurality of substrate pressing portions are provided at the prescribed intervals in the aforementioned embodiment, the present invention is not restricted to this. According to the present invention, the plurality of substrate pressing portions may alternatively be provided at irregular intervals. Alternatively, a single substrate pressing portion extending from one end to the other end along the extensional direction of the front end surface of the light source substrate may be provided.

While the substrate pressing portions and the light guide plate pressing portion are provided on the resin frame in the aforementioned embodiment, the present invention is not restricted to this. According to the present invention, the substrate pressing portions and the light guide plate pressing portion may alternatively be provided on a member other than the resin frame.

Figure 8:
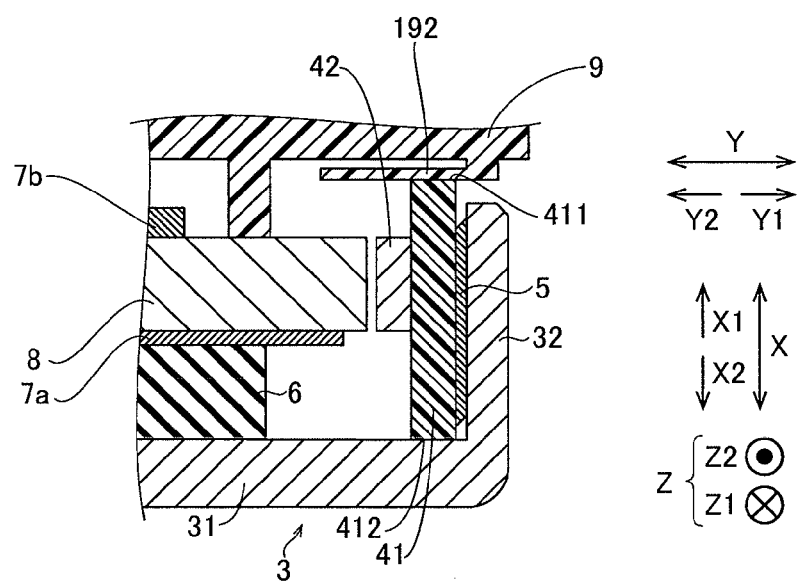
FIG. 8 is a diagram showing a substrate pressing portion of a TV according to another modification of the embodiment of the present invention.

While each of the substrate pressing portions is in the form of a rib in the aforementioned embodiment, the present invention is not restricted to this. According to the present invention, each of substrate pressing portions 192 may alternatively have a shape (L-sectional shape, for example) having a function of a elastically deformable resin spring, for example, other than the form of a rib, as shown in FIG. 8. Thus, the substrate pressing portions 192 are deflection-deformed so that pressing force applied to the light source substrate can be adjusted. Therefore, proper pressing force can be applied to the light source substrate.

While the first engaging portion according to the present invention includes the holes and the second engaging portion according to the present invention includes the claw portions in the aforementioned embodiment, the present invention is not restricted to this. According to the present invention, the first engaging portion may alternatively include the claw portions, and the second engaging portion may alternatively include the holes. Alternatively, the first engaging portion and the second engaging portion may be in the form of hooks corresponding to each other.

While the double-faced adhesive tape having a thickness of 0.5 mm is employed in the aforementioned embodiment, the present invention is not restricted to this. According to the present invention, a double-faced adhesive tape having a thickness other than 0.5 mm may alternatively be employed so far as the double-faced adhesive tape can be shear-deformed in a direction toward the bottom surface of the heat sink.

What is claimed is:

1. A display device comprising:
   a display device body;
   a display portion arranged on a front side of the display device body, displaying an image;
   a light source substrate mounted with a light source supplying light to the display portion;
   a light guide plate arranged backward of the display portion to be opposed to the light source substrate, having a light incident surface including a side surface receiving light emitted from the light source, guiding the light to the display portion;

a heat sink arranged backward of the light guide plate, including a light source substrate fixing portion to which the light source substrate is attached and fixed by a double-faced adhesive tape; and a substrate pressing portion pressing a front end surface of the light source substrate in a direction toward a bottom surface of the heat sink in a surface contact state, wherein:

the light source substrate fixing portion is formed in a substantially L shape such that a part of the heat sink is bent toward a front side of the display device body, the light source substrate is arranged substantially parallel with respect to a front-back direction of the display device body, the light guide plate has a substantially rectangular parallelepiped shape whose side surface is substantially perpendicular with respect to a display surface of the display portion, and the light guide plate is configured to emit the light incident from the side surface via the front surface.

2. The display device according to claim 1, wherein
the front end surface of the light source substrate is flattened, and
a portion of the substrate pressing portion pressing the front end surface of the light source substrate is flattened.

3. The display device according to claim 1, wherein
a plurality of the substrate pressing portions are provided at prescribed intervals along an extensional direction of the light source substrate in a position corresponding to the front end surface of the light source substrate.

4. The display device according to claim 1, wherein
the heat sink is made of metal,
the light source substrate fixing portion is formed by bending a part of the heat sink frontward,
the light source substrate includes a rear end surface opposite to the front end surface in addition to the front end surface pressed by the substrate pressing portion, and
the front end surface of the light source substrate is pressed in the direction toward the bottom surface of the heat sink so that the rear end surface of the light source substrate comes into contact with the heat sink.

5. The display device according to claim 4, wherein
the rear end surface of the light source substrate is flattened, and
a portion of the heat sink coming into contact with the rear end surface of the light source substrate is flattened.

6. The display device according to claim 1, wherein
a light irradiation portion of the light source is opposed to the light incident surface of the light guide plate in a state where the front end surface of the light source substrate is pressed in the direction toward the bottom surface of the heat sink by the substrate pressing portion.

7. The display device according to claim 4, wherein
the heat sink includes a concave portion in a position corresponding to the rear end surface of the light source substrate, and
the rear end surface of the light source substrate is fitted into the concave portion.

8. The display device according to claim 4, wherein
the double-faced adhesive tape is shear-deformed in the direction toward the bottom surface of the heat sink in a state where the front end surface of the light source substrate is pressed by the substrate pressing portion so that the rear end surface of the light source substrate is moved to come into contact with the heat sink.

9. The display device according to claim 8, wherein
the double-faced adhesive tape is configured to maintain adhesion of the light source substrate to the heat sink when the double-faced adhesive tape is shear-deformed in the direction toward the bottom surface of the heat sink.

10. The display device according to claim 8, wherein
the double-faced adhesive tape is attached to a position of the light source substrate separated by a prescribed interval from the rear end surface of the light source substrate.

11. The display device according to claim 8, wherein
the double-faced adhesive tape has a thickness sufficient for shear-deformation in the direction toward the bottom surface of the heat sink.

12. The display device according to claim 1, further comprising a resin frame configured to fix the light guide plate, arranged on a front side of the light source substrate, wherein
the substrate pressing portion is integrally formed on the resin frame to extend along an extensional direction of the front end surface of the light source substrate.

13. The display device according to claim 12, further comprising a rear frame provided on a rear side of the heat sink, wherein
the resin frame includes a first engaging portion,
the rear frame includes a second engaging portion engaging with the first engaging portion, and
the substrate pressing portion is configured to press the front end surface of the light source substrate while the first engaging portion and the second engaging portion engage with each other so that the front end surface of the light source substrate is held between the resin frame and the rear frame.

14. The display device according to claim 13, wherein
the first engaging portion of the resin frame comprises a hole,
the second engaging portion of the rear frame comprises a claw portion, and
the hole and the claw portion engage with each other so that movement of the resin frame and the rear frame in a direction separating from each other is restricted.

15. The display device according to claim 12, further comprising a light guide plate pressing portion integrally provided on the resin frame, wherein
the light source substrate includes the front end surface pressed by the substrate pressing portion and a rear end surface opposite to the front end surface,
an elastic member is arranged on the rear side of the light guide plate,
the substrate pressing portion and the light guide plate pressing portion provided integrally with the resin frame are configured to press the front end surface of the light source substrate and a front surface of the light guide plate, respectively, in the direction toward the bottom surface of the heat sink in a surface contact state,
the rear end surface of the light source substrate comes into contact with the heat sink in a state where the front end surface of the light source substrate is pressed in the direction toward the bottom surface of the heat sink, and
the light guide plate is configured to be supported from the rear side toward a front side by the elastic member while the front side of the light guide plate is pressed in the direction toward the bottom surface of the heat sink.

16. The display device according to claim 15, wherein
a reflective sheet is arranged between the light guide plate and the elastic member, and
the light guide plate is configured to be supported through the reflective sheet from the rear side toward the front side by the elastic member while the front side of the light guide plate is pressed in the direction toward the bottom surface of the heat sink.

17. The display device according to claim 1, wherein
the display device body has a substantially rectangular shape as viewed from a front side,
the light source substrate comprises a single light source substrate provided along one side of an edge of the display device body having the substantially rectangular shape, and
the substrate pressing portion is provided in a position corresponding to the front end surface of the single light source substrate on one side of the edge of the display device body.

18. The display device according to claim 6, wherein
a plurality of the light sources are provided in an extensional direction of the light source substrate, and
the light irradiation portion of each of the plurality of light sources is opposed to the light incident surface of the light guide plate in the state where the front end surface of the light source substrate is pressed in the direction toward the bottom surface of the heat sink by the substrate pressing portion.

19. A television set comprising:
a television display device body;
a receiving portion receiving a broadcast signal;
a display portion arranged on a front side of the television display device body, displaying an image;
a light source substrate mounted with a light source supplying light to the display portion;
a light guide plate arranged backward of the display portion to be opposed to the light source substrate, having a light incident surface including a side surface receiving light emitted from the light source, guiding the light to the display portion;
a heat sink arranged backward of the light guide plate, including a light source substrate fixing portion to which the light source substrate is attached and fixed by a double-faced adhesive tape; and
a substrate pressing portion pressing a front end surface of the light source substrate in a direction toward a bottom surface of the heat sink in a surface contact state, wherein:
the light source substrate fixing portion is formed in a substantially L shape such that a part of the heat sink is bent toward a front side of the display device body,
the light source substrate is arranged substantially parallel with respect to a front-back direction of the display device body,
the light guide plate has a substantially rectangular parallelepiped shape whose side surface is substantially perpendicular with respect to a display surface of the display portion, and
the light guide plate is configured to emit the light incident from the side surface via the front surface.

20. The television set according to claim 19, wherein
the front end surface of the light source substrate is flattened, and
a portion of the substrate pressing portion pressing the front end surface of the light source substrate is flattened.

* * * * *